United States Patent
Wang

Patent Number: 5,499,417
Date of Patent: Mar. 19, 1996

[54] MULTIPURPOSE INFLATABLE FLOATING PILLOW

[76] Inventor: Chih C. Wang, 2F., No. 3, Lane 280, Chung-Chan Rd., Hsin Tien Cith, Taipei Hsien, Taiwan

[21] Appl. No.: 357,612

[22] Filed: Dec. 13, 1994

[51] Int. Cl.⁶ ..................................... A47G 9/00
[52] U.S. Cl. .................. 5/652; 5/644; 5/656; 441/129; 482/53; 482/74; 177/144
[58] Field of Search .................. 5/644, 656, 652, 5/636, 449, 454, 654; 177/144; 441/129, 130; 482/74, 53

[56] References Cited

U.S. PATENT DOCUMENTS

| | | | |
|---|---|---|---|
| 4,277,859 | 7/1981 | Seaman | 5/644 |
| 4,528,705 | 7/1985 | Greenwalt | 5/644 |
| 5,318,344 | 6/1994 | Wang | 5/454 |
| 5,335,382 | 8/1994 | Huang | 5/454 |

Primary Examiner—Alexander Grosz
Attorney, Agent, or Firm—Pro-Techtor International

[57] ABSTRACT

A multipurpose floating pillow including an ellipse dish-like lower member having a spherical recess formed on its top surface for receiving an inflatable sac therein. A molded and resilient upper member covers and engages with the lower member. A container may be disposed in a recess formed on the bottom side of the lower member to receive, for example, a weight scale. Pads made of slightly rigid material may be disposed between the inflatable sac and the upper member. The resiliency and softness of the floating pillow can be adjusted through the inflation of the inflatable sac. The floating pillow will therefore not become deformed after long periods of use and may provide different functions on different occasions.

2 Claims, 5 Drawing Sheets

5,499,417

MULTIPURPOSE INFLATABLE FLOATING PILLOW

BACKGROUND OF THE INVENTION

The present invention relates to a pillow, and more particularly to a floating air-cushioned pillow having an inner inflatable sac.

There are various kinds of pillows available in our daily life to be used in different applications. Most of these pillows or pillow-like articles are stuffed with cotton or cloth and always become misshapen after being used for a long time. A misshapen pillow or the like causes discomforts to the user due to the uneven contour of the pillow. There are cooling pillows filled with water that are being developed to eliminate the problem of deformation after use. However, other problems arise with the temperature of water in the pillow. The temperature of water in the pillow is generally not comfortable to users. All of these problems reveal the unpractical design of existing pillows.

SUMMARY OF THE INVENTION

It is therefore a primary object of the present invention to provide a multipurpose pillow.

Another object of the present invention is to provide a multipurpose pillow which has adjustable resiliency and therefore can be used for a long time without becoming misshapen.

BRIEF DESCRIPTION OF THE DRAWINGS

The structure and functions of the present invention can be best understood by referring to the following detailed description of the preferred embodiments and the accompanying drawings, wherein.

DETAILED DESCRIPTION OF THE PREFERRED EMBODIMENTS

Figure 1:
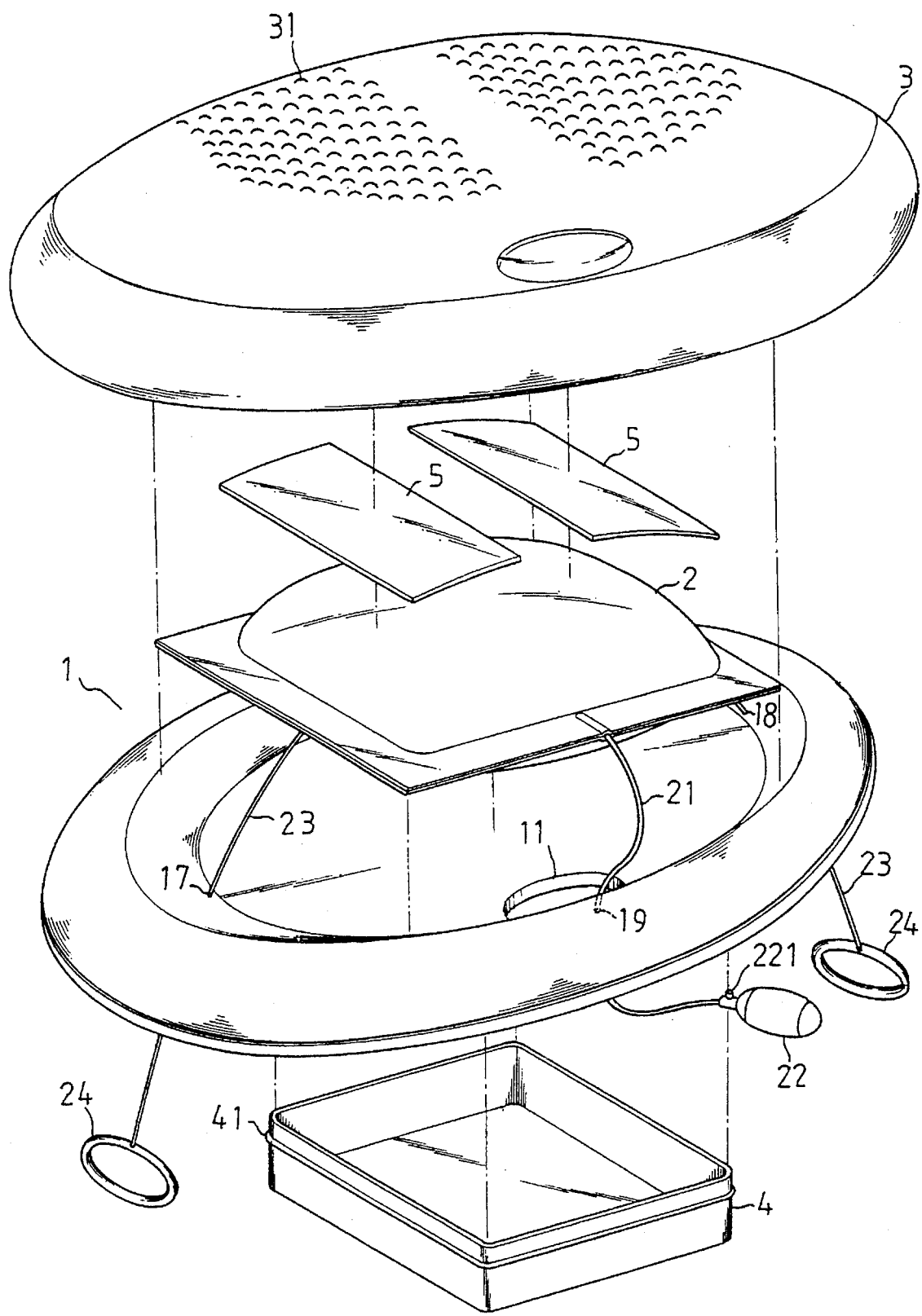
FIG. 1 is an exploded perspective view of the present invention.

Please refer to FIG. 1. A multipurpose air-cushioned pillow according to the present invention comprises an ellipse-shaped dish-like lower member 1 having a substantially centered spherical recess formed on its top surface to receive an inflatable sac 2. A square container 4 is disposed below the lower member 1. Pads 5 made of slightly rigid material are disposed between the inflatable sac 2 and an upper member 3. The upper member 3 is molded from a soft, resilient material.

Figure 2:
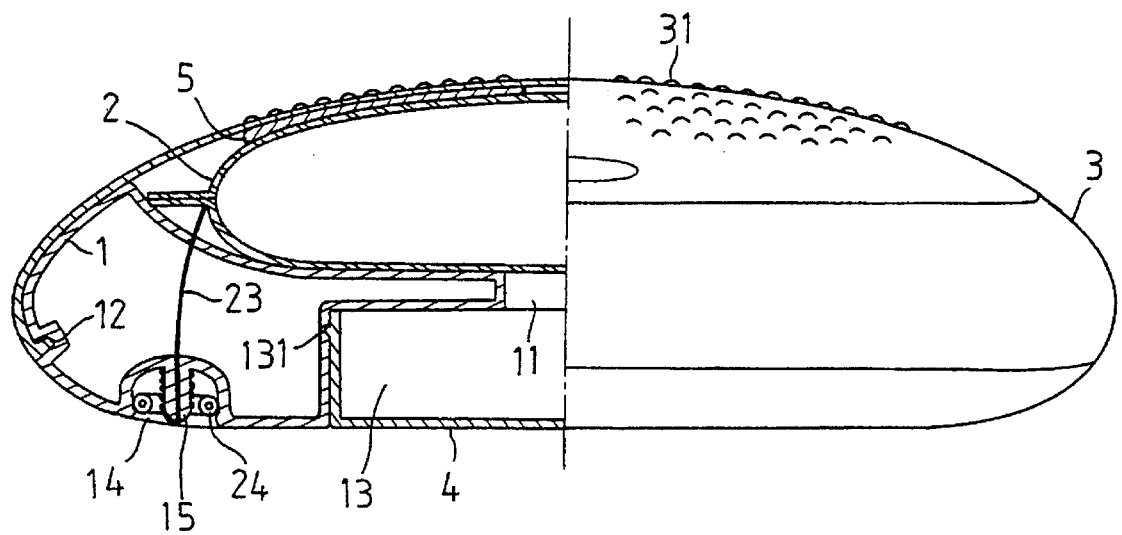
FIG. 2 is a partial sectional view of the present invention.

Please further refer to FIGS. 1 and 2. The lower member 1 includes in addition to the top spherical recess that receives the inflatable sac 2, through holes 17, 18, and 19 formed on a top surface thereof. Two pulling strings 23 and an inflating hose 21 thread through the through holes 17, 18 and 19. An opening 11 is provided at a front portion of the spherical recess to serve as an observation window.

A securing groove 12 extends around a lower periphery of the lower member 1 such that the upper member 3 may be attached to the lower member 1 by engaging a lower edge of the upper member 3 with the securing groove 12 of the lower member 1.

A square recess 13 formed at a bottom central portion of the lower member 1 receives the square container 4. Two round recesses 14 symmetrically disposed near two ends of the lower member 1 each receive a gripping ring 24 therein. An arcuate groove 16 formed in and extends along the lower periphery of the lower member 1 to accommodate the inflating ball 22 attached to a free end of the hose 21 when the hose and ball are not in use.

The inflatable sac 2 is disposed between the lower member 1 and the upper member 3. The above-mentioned inflating hose 21 and inflating ball 22 are connected to a front side of the inflatable sac 2 to inflate the sac 2. The above-mentioned pulling strings 23 are connected at their upper ends to two lateral edges of the sac 2 and at the other ends to the two gripping rings 24. Both the pulling strings 23 and the inflating hose 21 extend through the lower member 1 by threading through the holes 17, 18, 19, respectively. The two pulling strings 23 separately extend out of the lower member 1 via a downward projection 15 centered in the round recesses 14.

The upper member 3 is molded from flexible material and has a configuration corresponding to that of the lower member 1. The upper member 3 is therefore suitable for disposing above and covering an upper portion of the upper member 1. A plurality of bosses 31 are formed on the top surface of the upper member 3 within defined functioning areas thereof.

The square container 4 is designed so that it can be received in the square recess 13 formed at the bottom side of the lower member 1. Continuous rib 41 is provided around the outer periphery of the container 4 near the top edge of the container 4. The continuous rib 41 engages a narrow groove 131 formed at an inner top periphery of the square recess 13.

The pads 5 are disposed between the upper member 3 and the inflatable sac 2 at positions just below the areas of the upper member 3 provided with a plurality of bosses 31.

Figure 3:
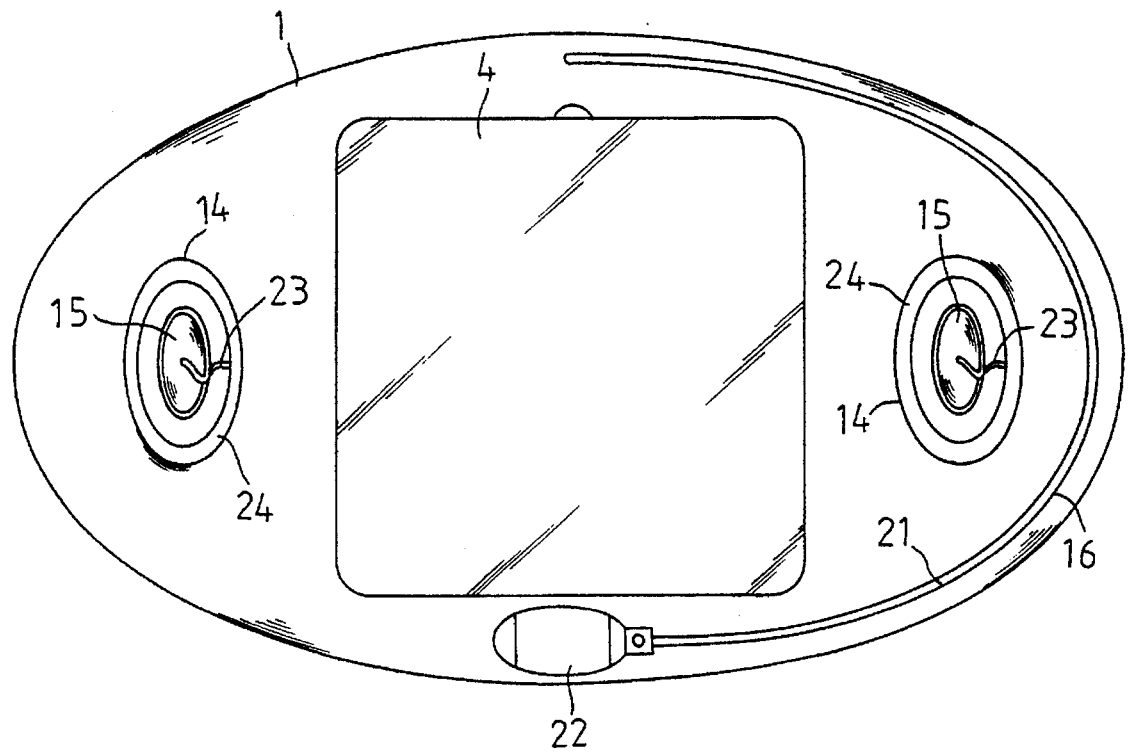
FIG. 3 is a bottom view of the present invention, showing the manner in which the pulling strings and the inflating ball are secured when they are not in use.

To use the floating pillow of the present invention, first inflate the inflatable sac 2 by means of the inflating ball 22. An air release knob 221 provided at a front end of the inflating ball 22 can be pressed to deflate the sac 2 in the event the latter is over-inflated. That is, the internal pressure of the inflatable sac 2 and accordingly the resiliency of the whole floating pillow can be controlled by means of the inflating ball 22 and the air release know 221. The inflating ball 22 and the inflating hose 21, when they are not in use, can be received into the arcuate groove 16 preformed at the bottom side of the lower member 1, as shown in FIG. 3. The two pulling strings 23, when they are not in use, can be separately wound around their corresponding central projections 15 and then, the gripping rings 24 can be firmly pressed into the round recesses 14 to be temporarily received therein.

Figure 4:
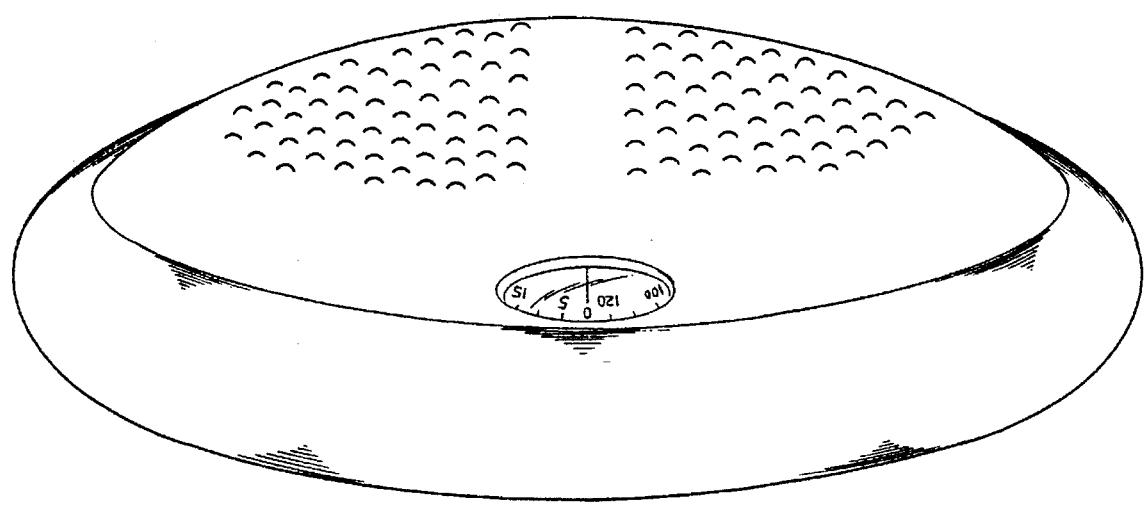
FIG. 4 is a first embodiment of the present invention.

With the above arrangements, the following advantages can be achieved by the present invention:

1. A weight scale can be disposed in the container 4 and observed from the window 22 provided on the floating pillows, as shown in FIG. 4. Whenever the floating pillow of the present invention is used to do a certain exercise, the user may conveniently observe the weight scale from the window 11 to see his/her weight after exercise.

Figure 5:
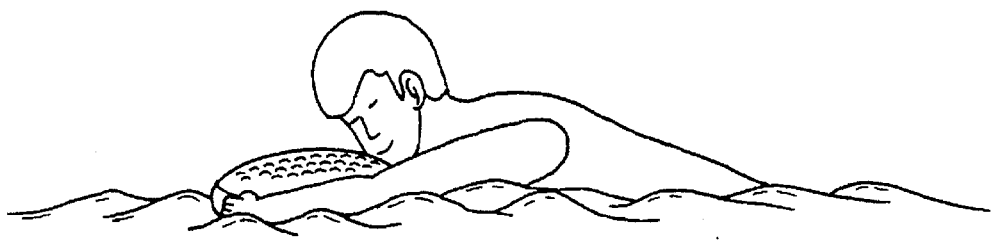
FIG. 5 is a second embodiment of the present invention.

2. When the inflatable sac 2 is fully inflated, the present invention may be used as a floater for water activities, as shown in FIG. 5.

Figure 6:
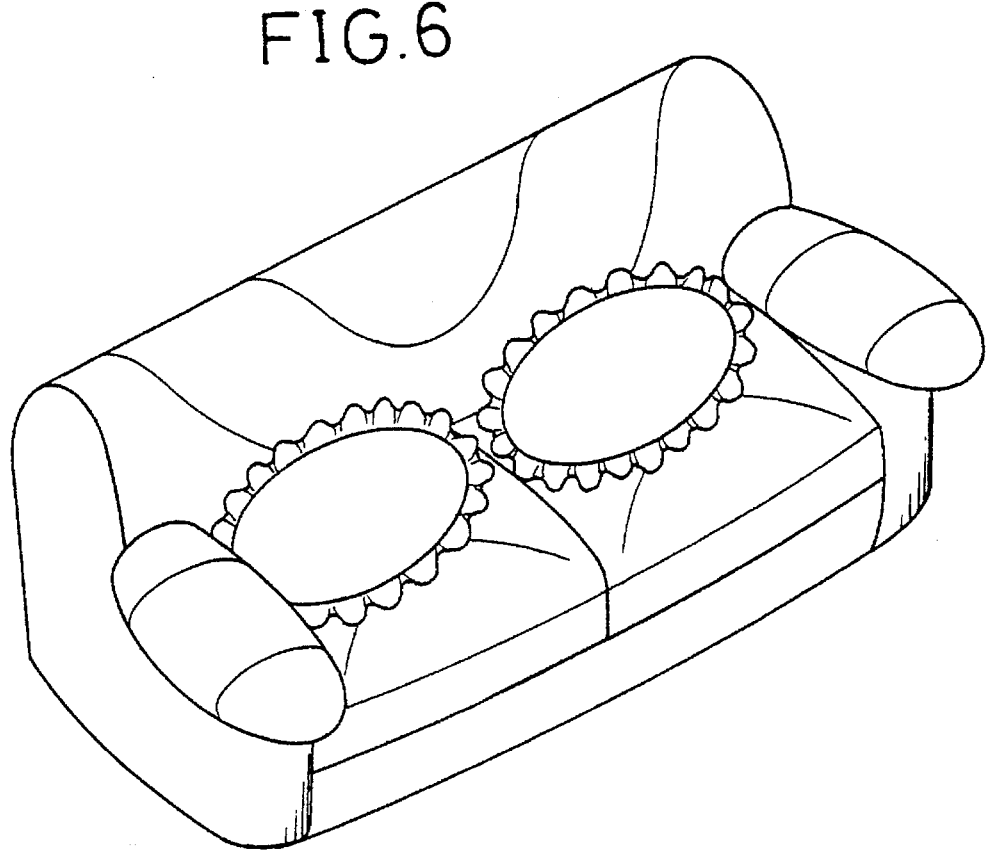
FIG. 6 is a third embodiment of the present invention.

3. The present invention can be decorated with different covers or cases and used as a pillow, a comforter, or a cushion, as shown in FIG. 6.

Figure 7:
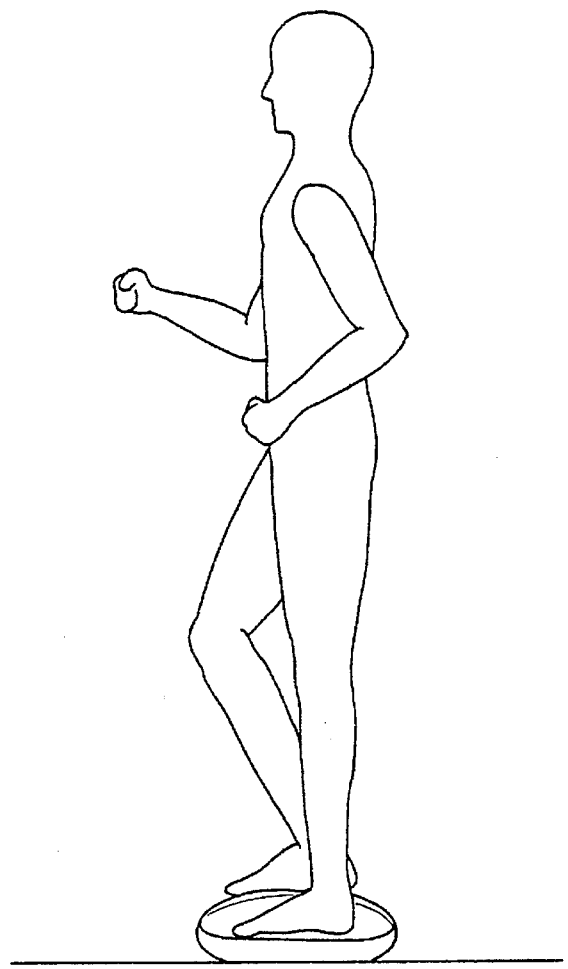
FIG. 7 is a fourth embodiment of the present invention.

4. The inflatable sac 2 of the present invention is so designed that it can bear a load of about 110 kilograms and can therefore be uses as a means to teach balance during walking. As shown in FIG. 7, when the user places his/her two feet alternately on the present invention, the air inside the inflatable sac 2 is forced to flow leftward or rightward and the user may try to keep balanced on the present invention.

Figure 8:
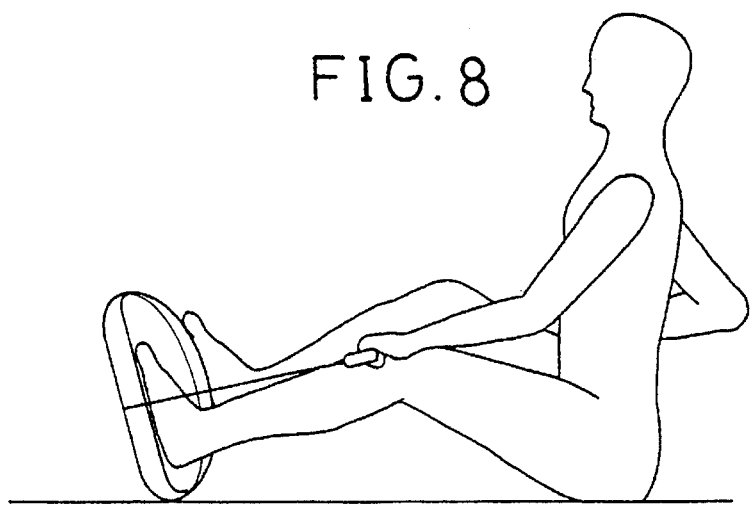
FIG. 8 is a fifth embodiment of the present invention.

5. The present invention may also be used when the user is in a sitting position. As shown in FIG. 8, the user pulls the pulling strings 23 at the gripping rings 24 and pushes the present invention by alternately pressing his/her two feet against the present invention, just like pedalling a bicycle, for the purpose of exercising.

The above embodiments are only used for illustration and are not intended to limit the scope of the present invention. Many modifications of these embodiments can be made without departing from the spirit of the present invention.

What is claimed is:

1. A multipurpose floating pillow comprising a lower member being provided on a top surface thereof with a central spherical recess for receiving an inflatable sac therein, a molded and resilient upper member being disposed above and engaged with said lower member, a container being disposed below said lower member in a recess provided at a bottom side of said lower member, and pads made of slightly rigid material being disposed between said inflatable sac and said upper member; said inflatable sac being controllably inflated by means of an inflating ball which is connected to said inflatable sac at a front portion thereof by means of an inflating hose; two gripping rings being symmetrically connected to two lateral sides of said lower member by means of two pulling strings; both of said inflating hose and said two pulling strings extending to said bottom side of said lower member via through holes formed on said lower member at predetermined positions while said two pulling strings being separately threaded through two substantially diametrically opposite round recesses symmetrically formed at said bottom side of said lower member via a central projection provided at each of said round recesses; said floating pillow being characterized in an adjustable resiliency which can be controlled through the internal pressure of said inflatable sac by means of said inflating ball and said inflating hose connected to said inflatable sac and thereby, permits said floating pillow to be used in different occasions.

2. A multipurpose floating pillow as claimed in claim 1, wherein said two gripping rings are received in said two round recesses when said gripping rings are not in use, and wherein said lower member is provided with an arcuated groove at a position suitable for accommodating and controlling said inflating hose and said inflating ball when they are not in use.

\* \* \* \* \*